United States Patent
Benson et al.

(10) Patent No.: US 7,135,202 B2
(45) Date of Patent: Nov. 14, 2006

(54) METHOD OF VACUUM TUMBLING FOR PROCESSING MEAT

(75) Inventors: Michael J. Benson, New London, MN (US); Steven D. Leitch, Willmar, MN (US); Daniel L. Franklin, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 591 days.

(21) Appl. No.: 10/625,345

(22) Filed: Jul. 23, 2003

(65) Prior Publication Data

US 2005/0019479 A1 Jan. 27, 2005

(51) Int. Cl.
*A23L 1/318* (2006.01)

(52) U.S. Cl. .............. 426/281; 426/641; 426/644; 426/647

(58) Field of Classification Search ............... 426/281, 426/641, 644, 647
See application file for complete search history.

(56) References Cited

U.S. PATENT DOCUMENTS

| | | | |
|---|---|---|---|
| 3,987,209 A | 10/1976 | Gatineau et al. | 426/396 |
| 4,409,704 A | 10/1983 | Seiffhart | |
| 4,446,779 A | 5/1984 | Hubbard et al. | 99/472 |
| 4,942,053 A | 7/1990 | Franklin et al. | 426/524 |
| 5,543,163 A | 8/1996 | Groves | 426/231 |
| 5,603,567 A | 2/1997 | Peacock | 366/139 |
| 5,714,188 A | 2/1998 | Gilchrist | 426/281 |
| 5,846,594 A | 12/1998 | Zimmerman et al. | 426/643 |
| 6,020,012 A | 2/2000 | Kauffman et al. | 426/281 |
| 6,040,013 A | 3/2000 | Karales | 427/281 |
| 6,105,490 A | 8/2000 | Horn et al. | 99/472 |
| 2002/0023549 A1 | 2/2002 | Thornton et al. | 99/472 |
| 2003/0180439 A1 | 9/2003 | Paterson et al. | 426/641 |

FOREIGN PATENT DOCUMENTS

| | | |
|---|---|---|
| AU | 584764 | 6/1987 |
| EP | 0028113 | 5/1981 |
| EP | 0209268 | 1/1987 |
| JP | 55054854 | 4/1980 |

OTHER PUBLICATIONS

Meat Focus International, Riëtte van Laack, Effect of sodium bicarbonate on the quality of pork, Nov. 1996, pp. 392-393.

*Primary Examiner*—Arthur L. Corbin
(74) *Attorney, Agent, or Firm*—IPLM Group, P.A.

(57) ABSTRACT

The present invention relates to a method of processing meat such as, but not limited to, turkey breast meat. The meat is vacuum tumbled prior to coagulation of blood within the meat, and the blood is withdrawn from the meat. The meat is then injected with a brine solution, tumbled, and further processed.

25 Claims, No Drawings

METHOD OF VACUUM TUMBLING FOR PROCESSING MEAT

BACKGROUND OF THE INVENTION

1. Field of the Invention

The present invention relates to a method of processing meat, more particularly, a method of processing poultry meat using vacuum tumbling prior to injecting the meat with a brine solution.

2. Description of the Prior Art

Consumers typically purchase meat products after making judgments about the quality of the meat and the price of the meat. Among other things, the aesthetic appearance, including the color of the meat and the texture of meat, contributes to the perceived quality of the meat. When meat contains blood spots and/or is pale, soft, and exudative ("PSE") meat, this negatively affects the perceived quality of the meat.

It is known that when the pH in meat is low and the temperature of the meat remains high, protein denaturation results and the meat becomes pale and exudative. To prevent/limit the occurrence of PSE meat, either the temperature of the meat must be lowered rapidly or the pH decline must be slowed. PSE meat results in a tremendous economic loss for the meat. Blood spots in the meat and/or PSE meat tend to be seasonal issues in processing meat such as turkey meat. Therefore, it is desirous to process meat in such a way to, prevent the appearance of blood spots and/or to discourage the onset of PSE meat.

Although there are processes that include the use of vacuum tumbling for various reasons, these processes do not result in the same effect or address the issues of concern. U.S. Pat. No. 4,409,704 discloses a process for treating meat to raise myosin protein to the surface of the meat and to increase the absorption of fluid or additives by first crushing and mashing the meat and then simultaneously shaking and tumbling the meat while keeping the meat refrigerated and under a vacuum.

U.S. Pat. No. 4,942,053 discloses a process for treating meat, preferably the muscles of swine having water contained within themselves. The muscles are placed in a container, and a vacuum is applied within the container to lower the temperature at which water boils so that the water within the muscles boils. The vacuum also results in raising myosin protein to the surface of the meat, which improves the product moisture retention, muscle surface cohesion, and ultimately the finished product quality. The meat is also agitated by tumbling within the container. The vapor inside the cavity from the boiled water is exhausted, and both cooling and massaging of the meat by the vacuum is created.

SUMMARY OF THE INVENTION

In a preferred embodiment method of processing meat, meat having arteries and veins is obtained, the arteries and the veins containing blood. The meat is tumbled under vacuum prior to coagulation of the blood, and the blood is withdrawn from the arteries and the veins in the meat with the vacuum, the arteries and the veins acting as conduits through which the blood is withdrawn. Tumbling slightly massages the meat.

In a preferred embodiment method of processing turkey breast meat, turkey is slaughtered to obtain turkey meat, and the turkey meat is de-boned. Turkey breast meat is obtained from the de-boned turkey meat and tumbled under vacuum prior to coagulation of blood in the turkey breast meat. The vacuum withdraws blood from arteries and veins in the turkey breast meat, the arteries and the veins acting as conduits through which the blood is withdrawn. The tumbling slightly massages the turkey breast meat.

In a preferred embodiment method of processing meat, meat having arteries and veins containing blood is obtained. Prior to coagulation of the blood within the meat, the meat is tumbled under vacuum for approximately 1 to 2 hours at 2 to 4 rpm and 10 Torr or less. The tumbling gently massages the meat, and the vacuum withdraws blood from the arteries and the veins, the arteries and the veins acting as conduits through which the blood is withdrawn.

DETAILED DESCRIPTION OF A PREFERRED EMBODIMENT

The present invention is a method of processing meat using vacuum tumbling. Although the present method of processing meat is described herein as a method of processing poultry, preferably whole muscle products such as turkey breast meat, it is recognized that other types of meat such as, but not limited to, poultry, pork, beef, fish, and seafood could also be used.

In the preferred embodiment, after slaughter, the turkey breast meat is cooled to an internal temperature of approximately 40° F. or less within 8 hours, as required under government regulations. Typically, meat is chilled in water for 2 to 6 hours at approximately 34 to 36° F. to achieve this result. Although an internal temperature of 40° F. or less is required under government regulations, this temperature is not necessary for the present invention. The meat could be chilled using a chiller, a vacuum tumbler, or any other means well known in the art.

The meat is then preferably de-boned. Although the preferred embodiment of the present invention preferably utilizes de-boned meat, it is recognized that meat such as, but not limited to, steaks or pork chops including bones could also be used. As large pieces of muscle are removed from the bone, the arteries and the veins within the meat remain substantially intact, which means that the arteries and the veins are still capable of transporting blood. It is understood that the arteries and the veins include capillaries. The arteries and the veins should remain substantially intact because if they are significantly punctured or ruptured, the present method is not as effective as desired. Preferably, additional processing that may damage the arteries and the veins should be performed after the vacuum tumbling to ensure that the arteries and the veins remain substantially intact. For example, injecting the meat, tenderizing the meat, and other processes are preferably performed after the vacuum tumbling.

The meat is then tumbled under vacuum, and a deep vacuum with a gentle tumble is preferably used to gently massage the meat. Rotation at a slow rate of speed is used during the vacuum tumbling to move the blood away from the vein system as it is drawn out of the meat, while gently massaging the meat. For 20,000 pounds of meat in a 20,000 pound vessel, the meat is preferably tumbled at approximately 2 to 4 rpm and a vacuum of approximately 10 Torr or less for 1 to 2 hours is preferably used. A vacuum level of 30 Torr is not as effective as 10 Torr or less. Although lower levels of vacuum may be used (Torr levels greater than 10 Torr) the effect of vacuum tumbling diminishes unless longer time periods are used.

Preferably, no water or liquid is added to the meat prior to tumbling under vacuum. However, enough water can be added to the tumbler to compensate for the evaporation that occurs during the vacuum process. Typical evaporation using this particular vacuum system would be 33 pounds per hour of process time. If excess water or liquid is added to the meat prior to vacuum tumbling, the process is not as effective as desired because the blood is not sufficiently drawn out of the arteries and the veins.

The vacuum withdraws blood from the arteries and the veins in the meat, the arteries and the veins acting as conduits through which the blood is withdrawn. The blood is drawn out of the arteries and the veins in a manner similar to how liquid is drawn through a straw, by slowly tumbling the meat, and blood is not allowed to re-enter the artery and vein systems of the meat. The tumbling under vacuum is conducted prior to coagulation of the blood, preferably within approximately 48 hours of slaughter. The deeper the vacuum, the faster the blood is withdrawn from the arteries and the veins. The longer the tumbling under vacuum is applied to the meat, the better the sliceability of the meat. Although some cooling of the meat may occur as a result of the vacuum being applied to the meat, which would be acceptable, this is not an intended effect of using the vacuum on the meat.

Pre-injection vacuum tumbling removes blood from the meat and reduces the affect of PSE meat in the final product. The process of the present invention reduces the appearance of blood spots in the meat, improves the color of the meat, and results in a more uniform color of the meat. If PSE meat is used, there is an enhanced performance of PSE meat when treated with the process of the present invention. PSE meat does not hold moisture as well, but treating PSE meat with the process of the present invention improved the moisture holding capacity. Therefore, the quality of the meat is improved.

The process of the present invention minimizes the amount of purge from the meat and therefore allows increased pump of approximately 2% into the meat thereby increasing the yield of the meat. Purge is calculated by weighing each unit of meat in the packaging including purge. The packaging and the purge are removed and the unit of meat is weighed, without the packaging and the purge. The tare weight of the packaging is then subtracted from the difference of the two weights. This amount is then divided by the weight of the original unit of meat, less the tare weight of the packaging. The amount of purge was decreased approximately 1 to 1.5% with the process of the present invention. As a result, additional pump could be added to the treated meat without resulting in additional purge as compared to untreated meat. In other words, if the same amount of pump was added to treated meat and to untreated meat, the treated meat would have approximately 1 to 1.5% less purge. Therefore, more pump could be added to the treated meat to result in approximately the same amount of purge in the treated meat and the untreated meat.

Further, the sliceability of the finished product is also improved. The internal slices of the finished product hold together better because the fibers do not separate as much because of improved bind due to improved protein functionality. This may be because blood includes acid that breaks down the meat, and the removal of blood reduces the acid in the meat and increases the quality of the meat. In other words, the pH in the meat is higher, and a higher pH holds more moisture, which increases the quality of the meat. Also, internal dissolved oxygen is removed from the meat by removing the blood from within the meat.

Once the vacuum tumbling is completed, the product is then processed as it would be normally. For example, in the preferred embodiment, the meat is injected with a brine solution and/or the meat is tenderized. Preferably, there is a delay of no more than approximately 72 hours between tumbling under vacuum and injecting with brine solution. The meat is typically tumbled for approximately 2 hours to massage the meat, to aid in absorbing the brine solution, and to extract protein to aid in binding the meat together. Then, the meat is stuffed and further processed. Stuffing is a term in the art used to describe the process by which whole meat muscle(s) or portions thereof are formed into a mold, shrink wrapped, and cooked to approximately 160° F. or greater.

In testing the effects of the process of the present invention, after the stuffing and the further processing of the meat was completed, each turkey breast was cut into one inch thick slices and analyzed for blood spots. Pin spots, veins, wing joints, and bruises were evaluated as being dark or faint and counted. The blood was graded on an intensity level scale of 1 being the most intense and 3 being the most faint. Ten samples from each test product was averaged to obtain the data. Ten bowls were evaluated for each product cut. A bowl is a product made of 2 to 3 whole breast muscles stuffed into a film pocket drawn on a Pioneer packaging machine. When evaluating the number of blood spots appearing on the face of the meat, from a quality assurance cutting standpoint, meat containing several blood spots on its face is rejected. When a bowl is cut, typically perpendicular from the top of the bowl, the face is on either side of the knife blade.

The amount of soft muscle and the sliceability of the meat may also be calculated. Soft muscle may be calculated by pressing into the cut face of the meat with one's thumb. The thumb will push further into soft muscle than better quality muscle. Soft muscle is measured in square inches. Typically, more than 20% soft muscle or more than 9.5 square inches on the total cut face of the meat is unacceptable. Sliceability may be calculated by slicing the meat at a specified thickness on a slicer. Ten slices are typically evaluated and rated on a scale of 1 to 5 on how well the slice holds together and what percentage of the slice is shredded or has separation. If the slice falls apart and has a shredded appearance of more than 20% of the slice, a rating of 1 is given. If the slice holds together but has a shredded appearance of less than 20% of the slice, a rating of 2 is given. If the slice is firm but has a shredded appearance of less than 10% of the slice, a rating of 3 is given. If the slice includes shredding or separation affecting less than 5% of the slice, a rating of 4 is given. If the slice is solid with no shredding, a rating of 5 is given. The average of the ten slices is calculated.

It is of course recognized that other suitable parameters may be utilized in the process of the present invention to achieve the desired results. For example, it is recognized that the speed of the tumbler, the amount of vacuum, and the length of the cycles are dependent upon the amount of product, the size of the tumbler, and the amount of massaging desired. Other modifications of the invention will be apparent to those skilled in the art in light of the foregoing description. This description is intended to provide specific examples of individual embodiments disclosed by the present invention. Accordingly, the invention is not limited to these embodiments or the use of elements having specific configurations and shapes as presented herein. Results from various tests performed to determine the effectiveness of the present invention are as follows:

EXAMPLE 1

A first test was performed on 7 blends of breast meat to determine the effect of vacuum tumbling on pre-injected turkey breast meat. 111,659 pounds of pre-injected, de-boned turkey breast lobes were treated through a deep vacuum tumbler system, and the meat was tumbled at 2 rpm for 2 hours at approximately 6 to 10 Torr. After the vacuum tumbling, 111,184 pounds of meat remained and there was a 1 degree rise in temperature (38 to 39° F.) in the meat. The meat was then injected with a brine solution resulting in 124,000 pounds and tumbled for the normal cycle, which is 8 rpm for 2 hours, resulting in 124,836 pounds. The meat was then stuffed resulting in 123,662 pounds and then processed as usual. The 123,662 pounds resulting after the stuffing was a 99.10% yield from the 124,836 pounds after the tumbling, which is higher than the typical yield of 98.8%.

A visual subjective evaluation of this test resulted in the reduction of the appearance of blood spots in the meat when compared to meat processed under the normal process, which does not include pre-injection vacuum tumbling of the meat. The meat also had a more uniform color, and the amount of soft muscle (PSE meat) had been reduced.

EXAMPLE 2

A second test was performed to determine the effect of vacuum tumbling on PSE induced meat. Approximately 200 pounds of whole turkeys was slaughtered and held approximately 20 minutes prior to chilling to induce PSE in the meat. The meat was then de-boned and placed in a vacuum tumbler for 2 hours at 2 rpm and 4 Torr. Next, injection of the meat with a brine solution and tumbling for 2 hours at 8 rpm was conducted. The meat was then stuffed and further processed. A Control from the same lot of birds was processed in the same manner but without the vacuum tumbling. The meat age at the start of the vacuum tumble was approximately 18 hours. The results are shown in Table 1.

TABLE 1

Effect of Vacuum Tumbling on PSE Induced Meat

| | 20 Minute Delay with Vacuum Tumbling | 20 Minute Delay Control |
|---|---|---|
| Purge | 2.9% | 4.2% |
| Blood | 6.66/face | 7.17/face |
| Soft Muscle | 10–35 | 50–75 |
| Sliceability | 4.7 | 3.8 |

The amount of purge in the treated meat was reduced in comparison to the Control meat. The purge in the treated meat was 2.9 and the purge in the Control meat was 4.2%. The treated meat also had a reduced appearance of blood spots although some blood spots were still present. A product cutting was conducted, and the amount of soft muscle (PSE) was reduced in the treated meat in comparison to the Control meat. In addition, the sliceability of the vacuum tumbled meat was better and there was less soft muscle in the meat. The treated meat had a sliceability of 4.7 and, in comparison, the Control meat had a sliceability of 3.8.

EXAMPLE 3

A test was performed to determine the vacuum tumbling exposure time sufficient to remove blood spots in PSE meat and to enhance the functionality of PSE meat. First, 50 pounds of turkey breast meat was identified with a brander as the Control meat. 20,000 pounds of turkey breast meat was then placed in the vacuum tumbler and processed for one hour at 6 Torr and 2 rpm. 50 pounds of breast meat was then removed and identified with a brander as Sample 1. The vacuum tumbling was resumed for the remaining one hour. 50 pounds of breast meat was removed and identified with a brander as Sample 2. The Control, Sample 1, and Sample 2 were injected with a brine solution, tumbled for 2 hours at 8 rpm, stuffed, and further processed. The finished product was evaluated using the Quality Assurance Audit for Pioneer and the 8490 Machine Deli Breast products. The meat age at the start of the vacuum tumble was approximately 6 hours. The test results are shown in Table 2.

TABLE 2

| | Vacuum Tumbling Exposure Time | | |
|---|---|---|---|
| | 1 Hour | 2 Hours | Control |
| Purge | 3.1% | 3.1% | 7.6% |
| Blood | 2.67/face | 2.00/face | 7.17/face |
| Soft Muscle | 25–50% | 25–40% | 25–60% |
| Sliceability | 4.5 | 4.6 | 3.7 |

The vacuum tumbling process cycle of 1 hour appeared to remove blood spots, reduce purge, and enhance meat functionality as well as 2 hours. Both Sample 1 and Sample 2 were improvements in comparison to the Control. The test results indicate that the purge level on the Control ranged from 5 to 8% while Samples 1 and 2 were approximately 3.0 to 3.3%. The amount of soft muscle in the Control ranged from about 40 to 50% while Samples 1 and 2 ranged from about 25 to 40%. The blood appeared to have been removed from the 1 hour test meat just as well as the 2 hour test meat. In addition, the sliceability for the 1 hour test meat and the 2 hour test meat were comparable.

EXAMPLE 4

A test was performed to determine the effectiveness of removing blood and enhancing the functionality of PSE in aged meat and to determine the effectiveness of holding vacuum tumbled meat 24 hours and 48 hours prior to injecting and tumbling the meat.

100 pounds of turkey breast meat was identified with a brander as the Control. 20,000 pounds of meat was placed in the vacuum tumbler and processed for 1 hour at 6 Torr and 2 rpm. 100 pounds of meat was removed and identified with the brander as Sample 1. The vacuum tumbling process resumed for the remaining hour. 200 pounds of meat were removed and identified with the brander as Sample 2. Sample 2 was further divided into two groups, Sample 2a and Sample 2b, which each included 100 pounds of meat. Sample 2a was held for 48 hours and the amount of purge was measured. The meat was then injected with a brine solution, tumbled for 2 hours at 8 rpm, stuffed, and processed.

The remaining meat (Control, Sample 1, and Sample 2b) was held for 24 hours and then injected with brine solution, tumbled for 2 hours at 8 rpm, and stuffed and processed. The meat was then evaluated. The turkey breast meat was between 72 and 96 hours old at the time of vacuum tumbling. The results are shown in Table 3.

TABLE 3

Effectiveness of Vacuum Tumbling on PSE meat

|  | 1 Hour (Held 24 Hours) | 2 Hours (Held 24 Hours) | 2 Hours (Held 48 Hours) | Control |
|---|---|---|---|---|
| Purge | 2.3% | 2.3% | 7.2% | 3.5% |
| Blood | 3.3/face | 1.5/face | 1.0/face | 4.17/face |
| Soft Muscle | 20–55% | 15–40% | 25–55% | 50–65% |
| Sliceability | 4.0 | 4.5 | 5 | 3.5 |

Vacuum tumbling reduced the appearance of blood spots. The vacuum tumbling process still appears to be effective when vacuum tumbled meat is held for 48 hours prior to being injected with brine solution and tumbled. The color and appearance of the meat was acceptable, and the sliceability of the meat was good. The meat also appeared more dense than the Control.

EXAMPLE 5

It has been shown that delays in cooling whole birds can contribute to the formation of PSE in turkey breast meat. A test was performed to determine the effect vacuum tumbling has on PSE induced meat. In addition, the test was performed to determine the effectiveness of holding vacuum tumbled meat 24 hours prior to injecting and tumbling the meat.

30 birds were taken off the evisceration line just prior to the transfer belt into the chiller. The 30 birds were tagged and held for 50 minutes and then placed into the chiller for approximately 6 hours at 34 to 36° F. The birds were collected at the end of the chiller and de-boned, and the breast meat was used in this test. 50 pounds of the harvested meat was held as the Control. The remaining meat was placed in the vacuum tumbler for one hour at 6 Torr and 2 rpm. Half the meat was removed and identified with a brander as Sample 1. The vacuum tumbling resumed for another hour. The vacuum tumbler was emptied and the meat was identified as Sample 2. Sample 1 was divided equally into Samples 1a and 1b, and Sample 2 was divided equally into Samples 2a and 2b. Immediately after the vacuum tumble process was applied, the Control and Samples 1a and 2a were injected with brine solution, tumbled for 2 hours at 8 rpm, stuffed, and processed. 24 hours after the vacuum tumbling, Samples 1b and 2b were injected with brine solution, tumbled for 2 hours at 8 rpm, stuffed, and processed. The meat age at the start of the vacuum tumble was approximately 6 hours. The meat was then evaluated. The meat in Table 5 was sliced approximately 3 days after processing was completed. The results are shown in Tables 4 and 5.

TABLE 4

Effect of Vacuum Tumbling on PSE Induced Meat

|  | 1 Hour | 2 Hours | Control |
|---|---|---|---|
| Purge | 4.7% | 3.9% | 5.9% |
| Blood | 0.33/face | 0.50/face | 4.14/face |
| Soft Muscle | 20–40% | 15–40% | 30–65% |
| Sliceability | 4.9 | 5.0 | 3.6 |

TABLE 5

Effect of Holding Vacuum Tumbled Meat for 24 Hours Prior to Injecting the Meat

|  | 1 Hour | 2 Hours |
|---|---|---|
| Purge | 7.1% | 7.0% |
| Blood | 0.50/face | 0.17/face |
| Soft Muscle | 25–60% | 40–70% |
| Sliceability | 4.8 | 4.6 |

Even after holding the meat for 24 hours prior to injecting the meat, the vacuum tumbling still enhanced the sliceability and reduced the amount of measurable soft muscle. However, the amount of purge in this product increased more than was expected, but this could have been caused by using non-cling film rather than cling film. The results of the test were similar to the tests from Example 4. Vacuum tumbling reduces the number of blood spots, reduces the amount of purge, enhances the sliceability, and reduces the amount of measurable soft muscle.

EXAMPLE 6

A test was performed to determine how long vacuum tumbled meat can be held prior to injection before the benefits of the vacuum tumbling are diminished. 20,000 pounds of turkey breast meat was vacuum tumbled for 2 hours at 2 rpm and approximately 6 Torr. Then, the breast meat was divided equally into three tanks. One tank was injected and tumbled 24 hours after the vacuum tumbling. The second tank was injected and tumbled 48 hours after the vacuum tumbling. The third tank was injected 72 hours after vacuum tumbling and tumbled 72 hours after being injected. The tumbling in each of the three tanks was for 2 hours at 8 rpm. The results are shown in Table 6.

TABLE 6

Effect of Time the Meat is Held after Vacuum Tumbling

|  | 24 Hours | 48 Hours | 72 Hours Plus 72 Hours |
|---|---|---|---|
| Purge | 3.6% | 2.3% | 3.3% |
| Blood | 0.85/face | 1.0/face | 1.45/face |
| Soft Muscle | 0–25% | 0–20% | 0–15% |
| Sliceability | 4.4 | 4.7 | 4.9 |

There appears to be no difference in purge, blood, soft muscle, and sliceability among the three time delays tested. The results indicate a 72 hour delay between vacuum tumbling and injecting is acceptable and shows no noticeable loss in functionality of the meat in yield.

EXAMPLE 7

A test was performed to determine whether vacuum tumbled meat could be held for up to 6 days prior to injection and tumbling without reducing the benefits of the vacuum tumbling process. The product was measured based on the ability to remove the blood within the arteries and the veins, the reduction of purge, and the functionality of the soft muscle.

20,000 pounds of 24 hour old breast meat was loaded in the vacuum tumbler, and 50 pounds was held to be used as the Control. The vacuum tumbled meat was processed for 1.5 hours at 2 rpm and approximately 6 Torr. Upon completion of the vacuum tumbling, 100 pounds of meat was removed and divided equally into Samples A and B, each including 50 pounds of meat. Sample A and the Control were injected with brine solution, tumbled for 2 hours at 8 rpm, stuffed and processed. Six days after vacuum tumbling, Sample B was injected with brine solution, tumbled for 2 hours at 8 rpm, stuffed and processed. The results are shown in Table 7.

TABLE 7

Effect of Holding Meat for 6 Days Prior to Injection

|  | 0 Days | 6 Days |
|---|---|---|
| Purge | 5.2% | 9.6% |
| Blood | 4.1/face | 4.4/face |
| Soft Muscle | 30% | 42% |
| Sliceability | 4.8 | 3.9 |

After 6 days, the results indicate a decrease in product performance in all categories except for the removal of blood spots in the meat. The purge level increased substantially when the meat was held for 6 days. The purge levels for meat injected immediately after vacuum tumbling averaged 5.2% purge as opposed to 9.6% for meat held for 6 days. Previous tests indicated that delays up to 72 hours did not affect these values. Therefore, the product performance diminished sometime between 3 and 6 days after the vacuum tumbling.

EXAMPLE 8

Another test was performed to determine the effect of vacuum tumbling on the appearance of blood spots on turkey breast meat.

A product cutting was performed in each of two different locations. The first cutting used meat that was not treated with vacuum tumbling prior to injection, and this meat resulted in failed product due to the appearance of blood spots. This product was very bloody and unacceptable. The second cutting used meat from the same flock and lot of birds that was treated with vacuum tumbling for 2 hours at 6 Torr and 2 rpm prior to injection. This meat resulted in acceptable product with little to no appearance of blood spots and no notable soft muscle. The color also appeared more uniform.

The failed product from the first cutting further validated the effectiveness of vacuum tumbling in reducing the appearance of blood spots in meat.

EXAMPLE 9

A test was performed to determine the effect the time delay between slaughter and deep vacuum tumbling has on the ability to withdraw blood from the arteries and the veins in the meat.

60,000 pounds of turkey breast meat was taken from a single flock of birds slaughtered on the same day and divided into three groups of 20,000 pounds. Each group was vacuum tumbled for 2 hours at 6 Torr and 2 rpm. The first 20,000 pounds was vacuum tumbled the same day, approximately 17 hours after it was slaughtered. Of the second 20,000 pounds, 10,000 pounds was vacuum tumbled 47 hours after it was slaughtered. Of the third 20,000 pounds, 10,000 pounds was vacuum tumbled 68 hours after it was slaughtered. From each group, 50 pounds of meat was removed prior to vacuum tumbling for use as a Control. The results are shown in Table 8.

TABLE 8

Effect of Time Delay between Slaughter and Vacuum Tumbling

|  | 17 Hours | | 47 Hours | | 68 Hours |
|---|---|---|---|---|---|
|  | Test | Control | Test | Control | Test |
| Blood (Total) | 1.7/face | 7.3/face | 2.3/face | 8.6/face | 3.9/face |
| Pin Spots (Dark) | 0.0/face | 1.0/face | 0.1/face | 2.1/face | 0.2/face |
| Pin Spots (Faint) | 1.3/face | 5.7/face | 1.7/face | 5.8/face | 3.1/face |

The meat that was vacuum tumbled within 17 hours was the best meat in terms of the reduced appearance of blood spots and visual appeal. The main difference between the test meats and the controls was in the blood spots. The two Controls for 17 hours and 47 hours had a total average of approximately 4.7 times greater than the Test for 17 hours, approximately 3.5 times greater than the Test for 47 hours, and approximately 2 times greater than the Test for 68 hours. Although the 47 hour Test meat had approximately ⅓ more blood spots than the 17 hour Test, it was still acceptable. The 68 hour Test had approximately 2.3 times more total blood spots than the 17 hour Test but had approximately ½ the total spots of the Controls.

Cutting results indicate the product vacuum tumbled within 48 hours had acceptable amounts of blood spots while product vacuum tumbled. 68 hours after slaughter had considerably more blood spots. Therefore, from these test results, the vacuum tumbling process should be applied within 48 hours of slaughter to obtain the greatest benefit of the process in removing blood from the arteries and the veins.

EXAMPLE 10

The test from Example 9 was repeated but used different time intervals. Again, 60,000 pounds of turkey breast meat was taken from a single flock of birds slaughtered on the same day and divided into three groups of 20,000 pounds. The first 20,000 pounds was vacuum tumbled the same day, approximately 8 hours after it was slaughtered. Of the second 20,000 pounds, 10,000 pounds was vacuum tumbled 32 hours after it was slaughtered. Of the third 20,000 pounds, 10,000 pounds was vacuum tumbled 56 hours after it was slaughtered. Each treatment utilized 6 Torr and 2 rpm. From each group, 50 pounds of meat was removed prior to vacuum tumbling for use as a Control. At the end of the test, the meat age was approximately 9 to 54 hours. The test results are shown in Table 9.

TABLE 9

Effect of Time Delay between Slaughter and Vacuum Tumbling

|  | 8 Hours | | 32 Hours | | 56 Hours | |
|---|---|---|---|---|---|---|
|  | Test | Control | Test | Control | Test | Control |
| Blood | 2.1/face | 9.9/face | 0.9/face | 7.4/face | 2.0/face | 5.4/face |
| Pin Spots (Dark) | 0.1/face | 1.5/face | 0.0/face | 0.5/face | 0.0/face | 0.7/face |
| Pin Spots (Medium) | 0.2/face | 3.3/face | 0.3/face | 1.3/face | 0.6/face | 1.3/face |
| Pin Spots (Faint) | 1.5/face | 4.1/face | 0.4/face | 4.8/face | 1.0/face | 2.7/face |

The overall performance of the vacuum tumbled meat is both statistically and visually superior to the Control products. There were 12 times more dark spots in the Control than in the vacuum tumbled meat, and just under 5 times more total spots in the control compared to the vacuum tumbled meat. Statistically, the 8 hour and the 56 hour meat was about the same. Visually, the 8 hour and the 32 hour vacuum tumbled meat looked very good, and the 56 hour vacuum tumbled meat showed signs of the vacuum tumbling process losing its effectiveness. The cutting results indicated that the product vacuum tumbled within 32 hours had acceptable amounts of blood spots while the product vacuum tumbled after 56 hours did not appear as acceptable because the blood appeared more intense. However, there was no difference between the 9 hour product and the 56 hour product as far as the average number of blood spots per face. The 56 hour delay appeared more acceptable than the 68 hour delay in Example 9. The greatest benefit of the vacuum tumbling process occurs when the meat is processed within 48 hours of slaughter.

All alternative modifications and variations of the present invention following in the spirit and scope of the appended claims are included. Since many embodiments of the invention can be made without departing from the spirit and scope of the invention, the invention resides in the claims hereinafter appended.

We claim:

1. A method of processing meat, comprising:
   a) obtaining meat having arteries and veins, the arteries and the veins containing blood;
   b) tumbling the meat under vacuum prior to coagulation of the blood; and
   c) withdrawing the blood from the arteries and the veins in the meat with the vacuum, the arteries and the veins acting as conduits through which the blood is withdrawn, wherein tumbling slightly massages the meat.

2. The method of claim 1, wherein additional processing that may damage the arteries and the veins is performed after the meat is vacuum tumbled.

3. The method of claim 1, further comprising:
   a) injecting the meat with a brine solution after tumbling under vacuum; and
   b) tumbling the meat to aid in absorbing the brine solution.

4. The method of claim 3, wherein there is a delay of less than approximately 72 hours between tumbling under vacuum and injecting with the brine solution.

5. The method of claim 1, further comprising:
   a) marinating the meat in a brine solution after tumbling under vacuum; and
   b) tumbling the meat to aid in absorbing the brine solution.

6. The method of claim 1, wherein the meat is turkey breast meat.

7. The method of claim 6, wherein the turkey breast meat is de-boned.

8. The method of claim 1, wherein the arteries and the veins within the meat remain substantially intact.

9. The method of claim 1, wherein tumbling under vacuum is performed within 48 hours after slaughter.

10. The method of claim 1, wherein the meat is tumbled under vacuum for approximately 1 to 2 hours.

11. The method of claim 1, wherein the meat is tumbled under vacuum at approximately 2 to 4 rpm.

12. The method of claim 1, wherein the meat is tumbled under vacuum at less than 30 Torr.

13. The method of claim 12, wherein the meat is tumbled under vacuum at approximately 10 Torr or less.

14. A method of processing turkey breast meat, comprising:
   a) slaughtering a turkey to obtain turkey meat;
   b) de-boning the turkey meat;
   c) obtaining turkey breast meat from the de-boned turkey meat; and
   d) tumbling the turkey breast meat under vacuum prior to coagulation of blood in the turkey breast meat, the vacuum withdrawing blood from arteries and veins in the turkey breast meat, the arteries and the veins acting as conduits through which the blood is withdrawn, wherein tumbling slightly massages the turkey breast meat.

15. The method of claim 14, further comprising:
   a) injecting the turkey breast meat with a brine solution after tumbling under vacuum; and
   b) tumbling the meat to aid in absorbing the brine solution.

16. The method of claim 15, wherein there is a delay of less than approximately 72 hours between tumbling under vacuum and injecting with the brine solution.

17. The method of claim 14, wherein the arteries and the veins within the meat remain substantially intact.

18. The method of claim 14, wherein tumbling under vacuum is performed within 48 hours after slaughter.

19. The method of claim 14, wherein the meat is tumbled under vacuum for approximately 1 to 2 hours.

20. The method of claim 14, wherein the meat is tumbled under vacuum at approximately 2 to 4 rpm.

21. The method of claim 14, wherein the meat is tumbled under vacuum at approximately 10 Torr or less.

22. A method of processing meat, comprising:
   a) obtaining meat, the meat having arteries and veins containing blood; and
   b) tumbling the meat under vacuum for approximately 1 to 2 hours at 2 to 4 rpm and 10 Torr or less prior to coagulation of the blood within the meat, the tumbling gently massaging the meat, the vacuum withdrawing blood from the arteries and the veins, the arteries and the veins acting as conduits through which the blood is withdrawn.

23. The method of claim 22, the meat being de-boned turkey breast meat.

24. The method of claim 22, wherein tumbling under vacuum is performed within 48 hours after slaughter.

25. The method of claim 22, wherein the arteries and the veins within the meat remain substantially intact.

* * * * *